Nov. 6, 1951  J. E. BRODBECK ET AL  2,573,786
SPRINKLER
Filed Aug. 11, 1945
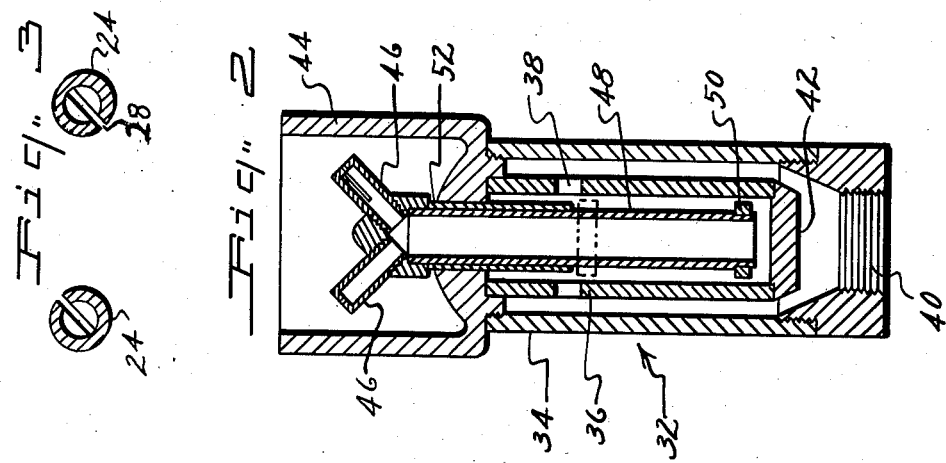
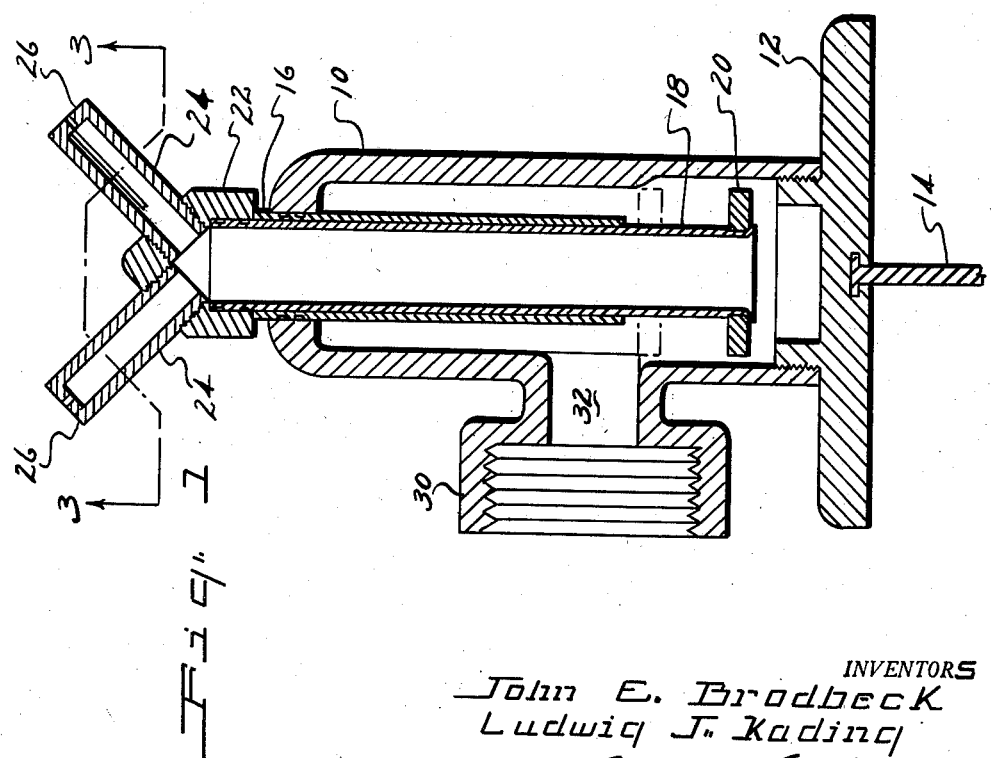
INVENTORS
John E. Brodbeck
Ludwig J. Kading
Mason Graham
Attys Patented Nov. 6, 1951

2,573,786

UNITED STATES PATENT OFFICE 2,573,786

SPRINKLER

John E. Brodbeck and Ludwig J. Kading, Compton, Calif.

Application August 11, 1945, Serial No. 610,292

3 Claims. (Cl. 299—61)

Our invention relates to sprinklers and particularly to sprinklers of the rotary type used for watering lawns and the like and which are projected above the surface of the ground only when in use.

Various sprinkler constructions of the type referred to have been proposed but in all such devices of which we have knowledge the moving parts of the sprinkler have had to work against an undesirable degree of friction.

It is an object of the invention to provide a rotary sprinkler in which the rotary element is substantially free from friction while in operation.

It is a further object of the invention to provide a substantially frictionless rotary sprinkler of simple but efficient construction.

It is a still further object of the invention to provide a rotary sprinkler construction which may be formed either to be permanently attached to water conduits or which may be moved from point to point connected to a hose.

It is a still further object of the invention to provide a frictionless rotary sprinkler of the kind which, when not in use, is retracted into a cup set into the ground.

Still further features and objects of the invention will hereinafter appear in the following description taken in conjunction with the accompanying drawings.

While we have herein disclosed preferred forms of the sprinkler of our invention, it is to be understood that the scope of the invention is not in any way limited by this illustrative showing but only as indicated by the scope of the appended claims.

In the accompanying drawings:

Fig. 1 is a cross section through a rotary sprinkler designed to be placed upon the surface of the ground;

Fig. 2 is a cross section through a modified form of the sprinkler designed to be permanently attached to a buried water supply system and to retract below the surface of the ground when not in use; and Fig. 3 is a cross section on the line 3—3 of Fig. 1.

In Fig 1 the numeral 10 indicates a housing furnished with a wide base 12 which may be provided, if desired, with a projecting spike 14 to aid in retaining it in position on any surface in which the sprinkler might tend to move while in operation, as for instance on a steep bank. The housing is furnished with a sleeve 16 pressed into the upper end thereof and extending into the interior of the housing.

A sprinkler tube 18 is arranged to have a sliding fit in the sleeve 16 and carries at its lower end a washer 20 forming an annular projecting flange. It is to be noted that this flange does not contact the lower end of the sleeve 16 at any time, as will be later explained.

A head 22 is mounted at the upper end of the sprinkler tube and preferably has an upper surface of conical form into which nozzles 24 are screwed. Preferably the nozzles are two in number and are screwed into tapped holes arranged in diametrically opposite sides of the top of the head. The nozzles may be formed from tubes having the outer end 26 closed. While the nozzles may be furnished with orifices of different shapes and arrangements, the shape preferred by us is provided by a cut extending across the top 26 of each tube and part way down one side thereof. The arrangement of these cuts or slots 28 is shown in Fig. 3, from which it will be seen that the open sides of the tube are directed oppositely and are inclined at an angle to the plane passing through the center of the sprinkler and nozzles.

In the form of the sprinkler shown in Fig. 1, water under pressure is admitted to the interior of the housing through a union 30.

When not in use the sprinkler tube will slide inwardly into the housing by gravity, the peripheral flange 20 being then positioned below the port 32 arranged intermediate the length of the housing and serving to admit water to the interior thereof. It will be noted that flange 20 is held spaced from the lower end of the housing by engagement of the sprinkler head 22 with the top of the sleeve.

When the water is turned on it will flow downwardly in the housing, passing around the edge of the flange and into the sprinkler tube and will escape through the cuts or slots 28. The pressure of the water will raise the tube 18 until the forces acting downwardly, due to the weight of the sprinkler tube, head and nozzles and the pressure or friction of the water acting against the flange 20 as the water seeks to pass the flange in the limited area available in its downward path are balanced by the forces acting upwardly due to the pressure of the water acting against the closed ends of the nozzles and other surfaces in its outward path. In this connection it may be noted that the flange occupies a major portion of the cross sectional area of the space between the housing wall and the sprinkler tube, having only a small annular space for passage of the incoming water. The cross-sectional area of the housing or tube 10 abruptly decreases just below the inlet 32 and as the tube 18 rises and flange 20 reaches this region of reduced cross-sectional area the area available for water flow is decreased thereby causing an increase in the velocity of the water past flange 20 which prevents the tube 18 and flange 20 from rising to the point where the flange contacts tube 16. In the operative position it has been found that the flange 20 comes to rest at about the lower edge of the inlet port.

Owing to the arrangement of the slots 28, the reaction of the escaping jets of water will cause a rapid whirling of the sprinkler tube in the direction away from the nozzles. It will be noted that there is no engagement between a rotating and fixed part in the axial direction of movement of the sprinkler tube. The friction between the sprinkler tube and the sleeve 16 is negligible since the contacting surfaces are continually lubricated by the water. There is, therefore, no measurable wear due to frictional contact between moving and fixed parts.

Referring now to the form of the invention shown in Fig. 2, the housing 32 is formed with a double wall 34, 36, the inner wall 36 being provided with an inlet port or ports 38 intermediate its length. The housing is furnished with a tapped bore 40 at its lower end by which it may be attached to nipples, not shown, screwed into a water pipe of a sprinkler system. The inner wall 36 is closed by a lower head 42. The upper end of the housing is provided with a cup or bowl 44 into which the sprinkler nozzles 46 carried by the sprinkler tube 48 are received when the sprinkler is not is use.

The construction of the sprinkler tube head and nozzles may be the same as that described with reference to Fig. 1 and therefore will not be again described.

The operation of this form of the device is in all respects similar to that of the form shown in Fig. 1, the water entering through the bottom of the outer wall of the housing and flowing upwardly between the inner and outer walls and through the port 38 into the interior of the housing, from which it flows around the peripheral flange 50 arranged around the bottom of the sprinkler tube and issues through the slots furnished in the spraying nozzles. The sprinkler tube will be automatically supported in a balanced position as previously described while the water is turned on. When the water is turned off the sprinkler tube will slide downwardly until the head carrying the nozzles contacts the upper end of the bearing sleeve 52.

The sprinkler of our invention has been found very satisfactory in use in that it requires no adjustment and will operate under very low water pressure because of the practically complete absence of friction.

Although preferred forms of the invention have been particularly shown and described, it is contemplated that various changes and modifications can be made without departing from the scope of the invention and it is intended to cover such changes and modifications as come within the scope of the claims.

We claim:

1. In a water sprinkler, a vertical tubular housing having a water inlet port in its side wall intermediate its ends adapted to be connected to a source of water under pressure and having a reduced bore in its top end wall, a guide sleeve secured in the bore and depending into the housing whereby to provide with the housing an annular water inlet chamber around the sleeve, the cross sectional area of the space inside said housing being greater below said port than in the region of said port and thereabove, the lower end of said guide sleeve being positioned above the region of greater cross-sectional area, a sprinkler tube axially slidably mounted in the sleeve and normally projecting at its lower end below the bottom end of the sleeve into the region of greater cross-sectional area, a sprinkler head carried by the top end of the tube and providing a stop shoulder limiting axial movement of the tube inwardly of the sleeve, said tube being axially projectible from the sleeve in response to water pressure against the head, and means for limiting outward axial movement of the tube in the sleeve, comprising an annular baffle carried by the bottom end of the tube in position to be impinged against by water in the chamber, said baffle being positioned in said region of greater cross-sectional area when in inoperative position.

2. In a water sprinkler, a vertical tubular housing having a water inlet port in its side wall intermediate its ends adapted to be connected to a source of water under pressure, said housing having a bore at its upper end, a sprinkler tube mounted for sliding movement in said bore and provided with sprinkler outlets externally of said housing, means reducing the cross-sectional area of the annular space in said housing around said tube in a region no higher than the region of said port relative to the cross-sectional area of said annular space below said means, the inner end of said sprinkler tube, in inoperative position, being below the region of reduced cross-sectional area, and an external flange on said sprinkler tube adjacent the inner end of the tube.

3. A device as defined in claim 2 in which the means reducing the cross-sectional area of the annular space in the housing comprises, in part at least, a reduction in the external diameter of said housing.

JOHN E. BRODBECK.
LUDWIG J. KADING.

REFERENCES CITED

The following references are of record in the file of this patent:

UNITED STATES PATENTS

| Number | Name | Date |
|---|---|---|
| 1,259,902 | Parker | Mar. 19, 1918 |
| 1,871,258 | Coles et al. | Aug. 9, 1932 |
| 1,892,959 | Lippert | Jan. 3, 1933 |
| 1,919,245 | Munz | July 25, 1933 |
| 2,013,849 | Keys | Sept. 10, 1935 |
| 2,086,281 | Nelson et al. | July 6, 1937 |
| 2,323,701 | Barksdale | July 6, 1943 |